Nov. 28, 1950 — O. F. BORG — 2,532,220
GARDEN SHEARS
Filed Dec. 9, 1948
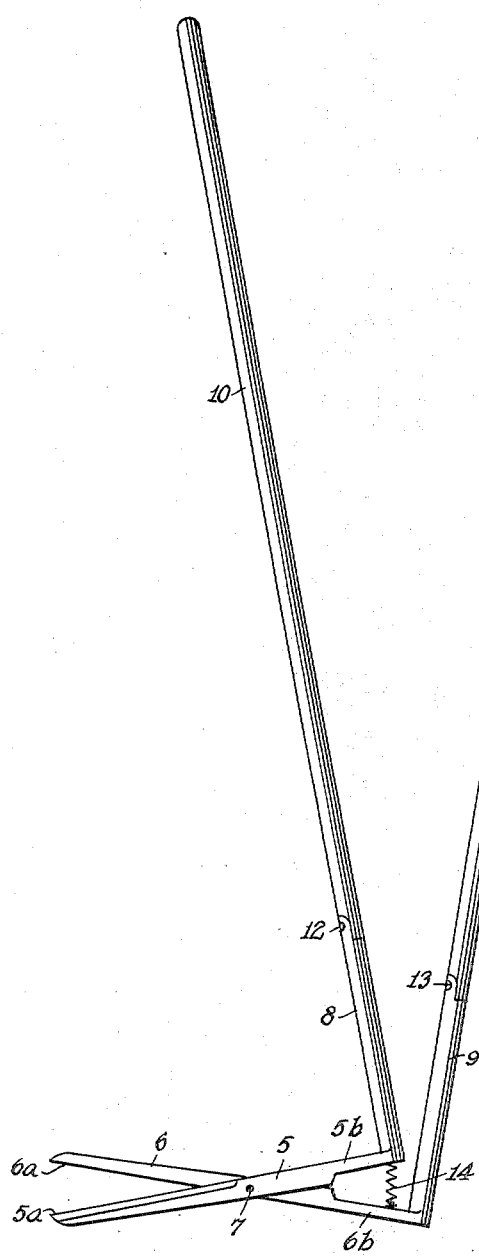
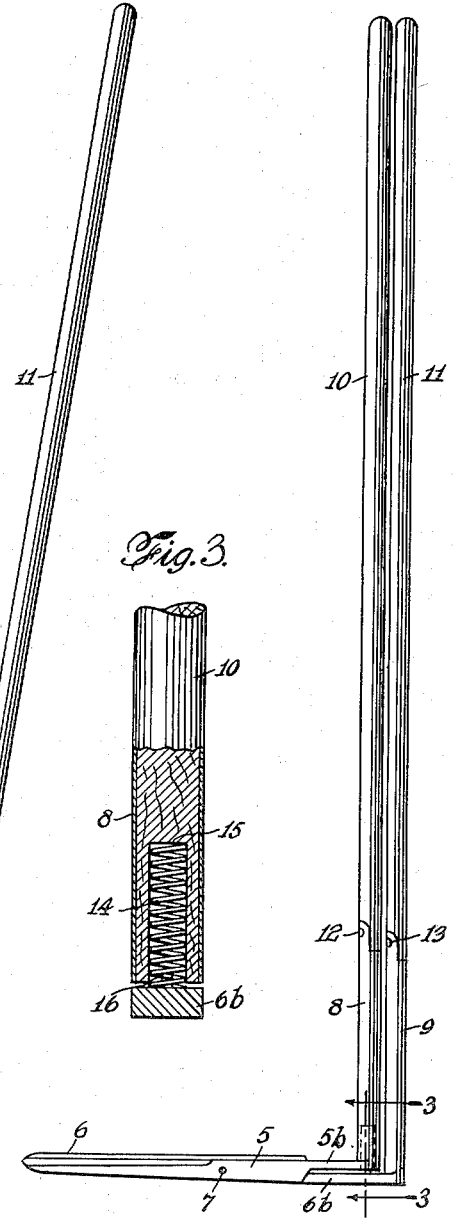
INVENTOR.
OSCAR F. BORG
BY
ATTORNEY.

Patented Nov. 28, 1950

2,532,220

UNITED STATES PATENT OFFICE 2,532,220

GARDEN SHEARS

Oscar F. Borg, Portland, Oreg.

Application December 9, 1948, Serial No. 64,270

2 Claims. (Cl. 30—257)

The present invention relates to horticultural implements such as plant trimming tools and more particularly to hedge or lawn shears, lawn edge trimmers and the like.

It is generally well known to persons engaged in horticultural, garden or farm work, that an ordinary lawnmower will not cut or trim the grass growing around fences, structures, trees, posts or the like within an area too near to said objects.

Likewise an ordinary lawn mower will not be useful in cutting overhanging long grass or weeds growing along the edges of lawns, flower beds, ornamental patches or the like, since a lawn mower can only operate in horizontal position.

It is, however, desirable, to make use in horticultural work or allied activities of shears which allow the cutting of grass or plants overhanging the borderline of lawns along footpaths or walks and are at the same time useful for any other trimming work like weeding or cutting off of dry twigs or branches which are out of reach of the ordinary length of cutting tools of the conventional type.

It is therefore an object of the present invention to provide a horticultural cutting tool which is adapted to cut vertically like ordinary scissors but which at the same time can be used for cutting on the ground as well as trimming overhead.

It is a further object of the instant invention to provide such an implement with elongated extended handle members so as to allow for cutting along lawn edges which are out of reach of a path or around any of the objects above mentioned the cutting whereof would ordinarily necessitate treading on fertilized soil or garden beds.

It is also another object of this invention to provide garden shears which can be operated by the user in an upright standing or walking position without requiring any stooping, bending down or kneeling which hitherto caused unnecessary strain and labor in work of this kind.

It is furthermore another object of this invention to provide a lawn shears which can by virtue of its extended handle portions also be used for trimming hedges, trees or the like as well as for cutting fruit from high overhanging branches.

A further important object of this invention is to provide a garden tool which will exert a cutting action irrespective whether it is used in a position wherein the cutting blades are parallel with the ground or vertically positioned to it, whereby the tool will be usable for picking out weeds or other undesirable single plants at any location and whereby the tool can be held in any angular position with respect to the ground.

Another object of this invention is to provide in a garden implement of the character described, spring means which are so located in the handle portion of the tool that they will automatically bias the shears apart so that only a contracting action upon the handle will have to be exerted by the user, thereby minimizing the effort necessary for the work.

It is also an object of the invention to provide a trimming tool of the character described which can easily be carried upon the shoulder together with other conventional tools assimilating itself to their usual size and length.

Many more objects will become apparent through the following detailed description of the implement according to the invention wherein reference is being had to the accompanying drawing in which:

Fig. 1 is a side elevational view of the lawn shears with the blades shown in straddling position, also showing the spring means in extended position;

Fig. 2 is a side elevational view of the same lawn shears as shown in Fig. 1, but in closed position as would be found after a cutting operation; and Fig. 3 is a sectional view taken on the line 3—3 in Figure 2 and looking in the direction of the arrows, showing the spring means in compressed position within the handle portion of the implement.

Referring now more particularly to the drawing, there is shown in Figs. 1 and 2 a shears having two crosswisely disposed blades 5 and 6 which are pivotally fastened to each other at 7 by a rivet or other suitable means. These blades are disposed to have their cutting edges 5a and 6a in a vertical position so as to be able to engage therebetween objects which grow or hang substantially parallel to the ground.

Blades 5 and 6 extend into compact body portions 5b and 6b respectively, which are at a suitable distance from the pivot point 7, so as to assure proper lever force, bent upward in a rectangular position with respect to the blades, so as to form two reinforcement portions or sockets 8 and 9 wherein the handles 10 and 11 are fastened by suitable anchor means such as screws or rivets 12 and 13. The handles 8 and 9 can be made of any desired length according to the desired use of the tool, but will ordinarily be made of such length so as to be operable manually by a person of average height without causing that person to stoop.

One of the body portions (for purpose of example only Figs. 1 and 2, portion 5b) is longer than the respective other one and both body portions are formed so as to abut against each other when the shears are closed whereby handle 10 comes to lie within handle 11 with respect to the direction of the blades. This abutment is obtained by the blades 5 and 6 which are normally substantially vertically flat being helically turned or otherwise partially recessed and partially enlarged so as to assume a substantially horizontally flat position.

Spring means consisting of a spiral expansion spring 14 are located in a hollow bore 15 provided in the reinforcement portion 8 of blade body portion 5b. This spring is anchored with one end to the upper face of blade body portion 6b by suitable means 16 like bolts or screws or it can also be welded thereto. The free end of spring 14 abuts against the bottom of hollow bore 15 thereby through its expansion raising the body portion 5b of blade 5 and also handle 10 connected therewith, with respect to the other blade and the handle thereon.

Thus the shears are in a position to cut any object near or at the ground in a vertical fashion, by being guided along the ground with one hand gripping handle 11 while the other hand operates handle 10 in a cutting action.

It will also be understood that the shears can likewise be held erect in an upward direction above the head of the user so that they will be capable of trimming branches or twigs or fruits beyond the reach of the average person.

When carried on the shoulder it will be clear that the weight of the blades will tend to turn them so as to point in a downward direction whereby handle 10 will naturally come to lie on the shoulder while the hand of the user will lie on handle 11 to hold the tool in balance thereby overcoming the action of the spring and keeping the shears in closed condition while being carried.

It is understood that many modifications and adaptations can be applied to the implement shown in a preferred embodiment by those skilled in the art without departing from the scope and spirit of the present invention which is contained in the above specification and in the appended claims the novel improvement of which I desire to be protected by Letters Patent.

I claim:

1. A horticultural implement comprising a pair of shear-blades crosswise pivoted to each other by rivet means, said blades having acute edges disposed to reciprocate in a direction vertically to the ground, reinforcement elements integrally formed at the ends of said blades and angularly thereto, a pair of handles in said reinforcement elements extending therebeyond, and spring means in one of said reinforcement elements said spring means being adapted to abut against the extension of the other blade whereby said blades are normally maintained in an open spaced apart position.

2. In a garden tool, a pair of shearing blades each of same portions extending rearwardly from the point at which they are pivoted, a handle connected with each blade extension and positioned substantially at right angles thereto, a coiled spring supported upon the extension of one of said blades and a bore in the lower portion of one of the handles for engaging said spring and retaining same in operative position.

OSCAR F. BORG.

REFERENCES CITED

The following references are of record in the file of this patent:

UNITED STATES PATENTS

| Number | Name | Date |
|---|---|---|
| 955,287 | Schofield | Apr. 19, 1910 |

FOREIGN PATENTS

| Number | Country | Date |
|---|---|---|
| 8,869 | Great Britain | May 20, 1898 |
| 302,981 | Great Britain | Dec. 24, 1928 |